(12) United States Patent
Saporetti et al.

(10) Patent No.: US 6,616,039 B1
(45) Date of Patent: Sep. 9, 2003

(54) METHOD FOR AUTOMATIC REGULATION OF THE CHARACTERISTICS OF AN OPTICAL CODE READING SYSTEM

(75) Inventors: Claudio Saporetti, Bologna (IT); Stefano Amorosi, Bologna (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/469,500

(22) Filed: Dec. 22, 1999

(30) Foreign Application Priority Data

Dec. 22, 1998 (IT) .......................................... 98830773

(51) Int. Cl.[7] .............................................. G06K 7/10
(52) U.S. Cl. ................. 235/455; 235/454; 235/462.23; 382/190
(58) Field of Search .................. 235/462.01–462.49, 235/454, 455, 470; 382/165, 168, 170, 172, 181, 182, 183, 190

(56) References Cited

U.S. PATENT DOCUMENTS

| | | | | |
|---|---|---|---|---|
| 5,155,343 A | * | 10/1992 | Chandler et al. | 235/462.09 |
| 5,396,053 A | | 3/1995 | Swartz et al. | 235/462.15 |
| 5,525,788 A | * | 6/1996 | Bridgelall et al. | 235/462.08 |
| 5,569,901 A | | 10/1996 | Bridgelall et al. | 235/470 |
| 5,581,066 A | * | 12/1996 | Itoh et al. | 235/462.1 |
| 5,608,202 A | * | 3/1997 | Bridgelall et al. | 235/470 X |
| 5,677,523 A | * | 10/1997 | Coleman | 235/455 |
| 5,811,828 A | | 9/1998 | Laser | 250/566 |
| 5,969,325 A | * | 10/1999 | Hecht et al. | 235/462.25 X |
| 5,969,326 A | * | 10/1999 | Ogami | 235/462.27 |
| 6,070,800 A | * | 6/2000 | Fujita et al. | 235/462.11 |
| 6,219,438 B1 | * | 4/2001 | Giordano et al. | 382/110 |

FOREIGN PATENT DOCUMENTS

| | | |
|---|---|---|
| EP | 0 509 917 A | 10/1992 |
| EP | 0 851 375 A | 7/1998 |
| JP | 9-297807 A | * 11/1997 |

* cited by examiner

*Primary Examiner*—Karl D. Frech
*Assistant Examiner*—Jared J. Fureman
(74) *Attorney, Agent, or Firm*—Lowe Hauptman Gilman & Berner, LLP

(57) ABSTRACT

The method for automatic regulation comprises the steps of: acquiring an image; attempting reading of at least one optical code in the acquired image; detecting characteristic quantities of the acquired image only if the reading has been successful; and carrying out a large number of acquisitions of different images, obtaining a significant statistical datum of the characteristic quantities. The controlled parameters of the optical system are modified on the basis of this statistical datum detected, to optimise the reading. If the relationship between each controlled parameter and the respective characteristic quantities is not monotonic, the current valve of the controlled parameter is modified by at least one small positive deviation and one small negative deviation with respect to the current value; the value of the controlled parameter providing the best reading then becomes the central value for the successive readings.

39 Claims, 4 Drawing Sheets

(PRIOR ART)

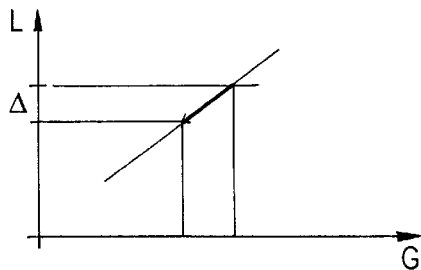
Fig. 4
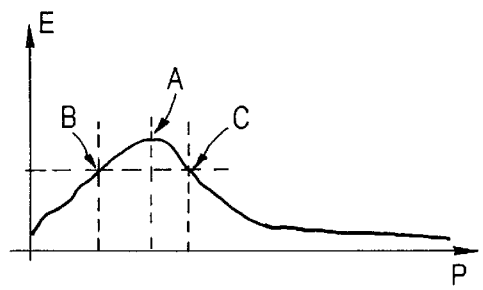
Fig. 5
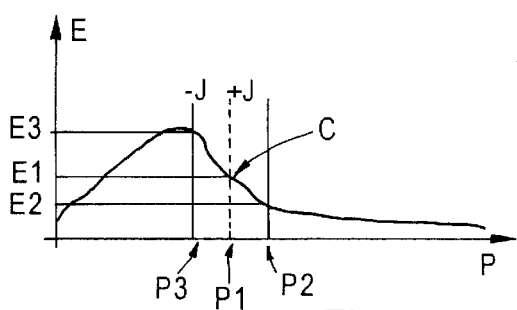
Fig. 6
Fig. 7
| H(cm) | N  | L  |
|-------|----|----|
| 0     | N1 | V1 |
| 10    | N2 | V2 |
| 20    | N3 | V3 |
| 30    | N4 | V4 |
| 40    | N5 | V5 |
Fig. 8
| H(cm) | N(-J) | E(-J) | N(+J) | E(+J) |
|-------|-------|-------|-------|-------|
| 0     | N1    | E1    | N6    | E6    |
| 10    | N2    | E2    | N7    | E7    |
| 20    | N3    | E3    | N8    | E8    |
| 30    | N4    | E4    | N9    | E9    |
| 40    | N5    | E5    | N10   | E10   |

METHOD FOR AUTOMATIC REGULATION OF THE CHARACTERISTICS OF AN OPTICAL CODE READING SYSTEM

The present invention relates to a method for automatic regulation of the characteristics of an optical code reading system.

BACKGROUND OF THE INVENTION

The term "optical code" is used below to denote any graphic representation that has the function of storing coded data. A particular example of an optical code comprises linear or two-dimensional codes, wherein the data is coded by suitable combinations of elements with a predetermined shape, for example squares, rectangles or hexagons, of dark colour (usually black) separated by light elements (spaces, usually white), such as bar codes, stacked codes (including PDF417), Maxicode, Datamatrix, QR-Code, colour codes etc. The term "optical code" further comprises, more generally, other graphical forms with the aim of coding information, including uncoded characters (letters, numbers, etc.) and specific patterns (such as stamps, logos, signatures etc). The information may also be coded by more than two colours, in grey tones for example.

The optical codes can be read by acquiring two-dimensional images in the area where a code is expected to be and localizing the code inside the image. In general, code localization involves a series of steps for initially distinguishing, within the previously stored image, the region or regions where at least one code is present; then localizing specific recognition patterns typical for each code; acquiring data concerning actual code type; and finally accurately delimiting the code. Subsequently, the delimited image of the code is processed to extract the features necessary for decoding and finally, the code is decoded to extract the data required. In particular, decoding can be completed successfully, when data are extracted and recognised as correct, or it can be completed negatively, when the processing system does not succeed in extracting any data, or when the probability of the data extracted being correct is insufficient, or when the data extracted does not correspond to the data required.

The reading success probability depends on a plurality of factors, some of which are external to the reading system (such as quality of the optical code to be read), and others are due to the opto-electrical/mechanical parameters of the reading system. In fact, every reading system, like any other physical system, has variable characteristics, depending on the individual product, on the type of installation and on time. In particular, the characteristics of the reading system depend on the individual components having characteristics varying within a specific tolerance (spread). In addition, the characteristics of many components vary as their external conditions vary (e.g. the temperature) and are subjected to ageing.

To eliminate these problems, methods for calibration are known, used both during production and installation; in addition, methods for regulation are known which are controlled automatically or by an operator and act during working of the system concerned.

In an optical code reading system for objects in uninterrupted movement, it is particularly difficult to regulate the characteristics, since it is not possible to concentrate on a reference image and the characteristics of the images to be acquired vary very quickly.

For a better understanding of the existing problem, reference is made to FIG. 1, which shows a typical optical code reading system, generally indicated at 1, comprising a conveyor belt 2, supporting an object 3 carrying an optical code 4, in this case a bar code. The conveyor belt 2 is associated to an optical encoder 5 for measuring the speed of the object 3; in addition, at one side of the conveyor belt 2, a presence sensor 6 and a height sensor 7 are present. Above the conveyor belt 2, an image acquisition device 10 is arranged, having a sensitive area 11 and supporting a lighting element 12; the image acquisition device 10 is also connected to a processing unit 13, here represented by a personal computer, which can optionally also be integrated in the image acquisition device 10.

For correct working of a system of the type shown in FIG. 1, it is essential to have correct setting of many parameters of the image acquisition device 10, of the lighting element 12 and of the processing unit 13. In particular, in an optical code reading system, essential characteristics comprise image focussing and brightness; other important characteristics are for example apparent dimensions of the object to be read and fixed deformations of the optical code, caused by printing and/or perspective phenomena. These characteristics can be detected directly or by measuring some physical quantities. For example, image focussing can be detected by measuring the energy of an analogue or digital signal supplied by the image acquisition device 10, since, as known, blurred images have low brightness gradients and therefore low energy.

The characteristics of the reading system, and thus the corresponding measuring quantities, depend on the value of a plurality of parameters of the reading system; for example, among the parameters that may be regulated, the following are important: position of the automatic focussing device; sensitivity of the image acquisition device 10 (i.e. gain of the circuits inside the device 10 that acquire and carry out initial processing of the electrical signals generated in the sensitive area 11); power irradiated by the lighting device 11 (i.e. the supply voltage provided to the lighting element 12); speed of scanning of the object to be examined (set externally, but dependant on the movement speed of the conveyor belt 2); and threshold values necessary in the decoding process, to decide, for example, whether a specific voltage level corresponds to a "white" or to a "black". In addition, the optimum value of some of these parameters (for example the position of the automatic focussing device, the irradiated power and the sensitivity of the telecamera), depend on the height of the object with respect to the image acquisition device 10.

In a reading system where the images acquired in sequence differ little from one another (for example in television shots), the problem of optimising these parameters has already been solved in various ways. For example, all commercial television telecameras have an automatic gain control, allowing them to adapt to the various lighting conditions: analysis of the latest acquired image allows the telecamera to adapt its sensitivity for acquiring the successive images, which, it is assumed, do not differ significantly from the present image. Similarly, all modern commercial telecameras have an automatic focussing device analyzing the latest acquired images (for example based on color convergence).

In practice, feedback mechanisms are used for quickly obtaining the best possible quality of the image.

However, the aforementioned feedback mechanism no longer functions when the image characteristic variation speed becomes so fast to be comparable to the acquisition speed, i.e. when the images acquired in sequence can be completely different from one another. In these cases it is necessary to predict the characteristics of the next image to appear to the telecamera and to optimise a priori all the acquisition parameters.

The use of additional sensors, for example supplying in advance the data concerning the distance between the object and the telecamera or its average brightness value, can improve the prediction capacities, but often this is not sufficient.

For example, the lighting variations caused by the lamp ageing cannot be measured (and therefore compensated for), simply by evaluating the average brightness value measured on the objects to be acquired: an excessively long sequence of dark objects could cause to believe that the lighting unit has suddenly aged.

Similarly, the optimum focussing position could vary over time, owing to fluctuations of the electro-mechanical characteristics of the automatic focussing positioning device or of the distance sensors.

SUMMARY OF THE INVENTION

The object of the invention is thus to provide a method for automatic regulation eliminating the disadvantages of the known solutions and applicable in particular in case of high variation speed of the characteristics of successive images.

According to the present invention, a method is provided for automatic regulation of at least one characteristic variable of an optical code reading system, characterised by the steps of:

a) acquiring an image;

b) attempting a reading of at least one optical code in said image;

c) verifying whether said reading has been completed successfully;

d) if so, detecting said characteristic variable for said image; and e) modifying at least one controlled parameter acting on the variation of said measured characteristic variable.

The characteristic variable (or quantity) is advantageously acquired several times, to obtain an average statistical datum for a large number of readings and to measure any substantial differences between successive images; in addition, the regulation is carried out continually, to monitor the reading system characteristics variations due to environmental causes or to modifications of the internal components.

The regulated characteristic quantities comprise image brightness and the focussing quality and the controlled parameters are selected from focussing position, image acquisition sensitivity, lighting power, decision threshold values used in reading and image scanning speed.

If the relationship between each controlled parameter and the respective characteristic quantities is not known, the present method modifies the value of the present parameter by at least one small positive displacement and one small negative displacement with respect to the present value and acquires the value of the respective characteristic variable in both cases, to evaluate which of the two displacements provides better image quality. The new value of the controlled parameter becomes the central value for the successive readings. By repeating this process, the central value of the controlled parameter tends quickly towards the optimum position and any variations of this position over time are monitored.

BRIEF DESCRIPTION OF THE DRAWINGS

Further characteristics of the invention will become apparent from the description of a preferred embodiment, provided purely by way of non-limiting example and illustrated in the attached drawings, wherein:

FIGS. 4–6 illustrate the functions correlating some parameters to be controlled in the system in FIG. 1 with respective control quantities;

FIGS. 7 and 8 show tables usable in the present method; and

DETAILED DESCRIPTION OF THE INVENTION

The present method allows both to automatically set the parameters of the optical code reading system initially, using an initial self-learning process, if the reading system allows to wait for a specific initial learning period (during which the reading system cannot be considered correctly operating), and to modify continually the existing regulation for adjusting in an optimized way the value of the parameters to the variations over time, in the surrounding environment and in the internal components (self-adjustment).

Figure 1:
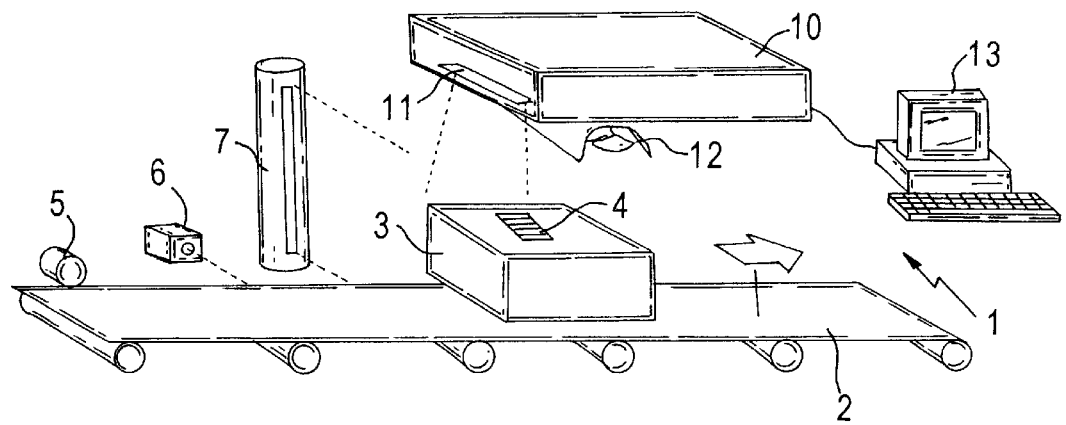
FIG. 1 shows an optical code reading system of known type.
Figure 2:
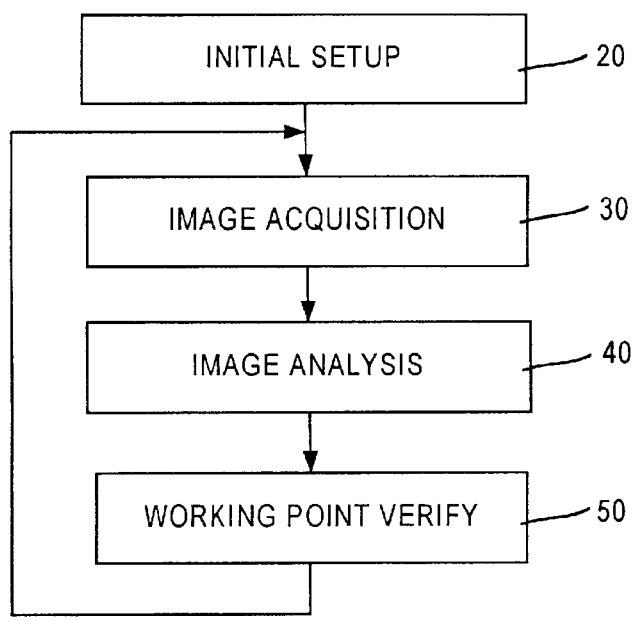
FIG. 2 shows a flow chart of the present method.

In particular, in the embodiment of FIG. 2, according to the present method, initially there is an optional step of initial setting the parameters (block 20). This step, which is manual, is carried out once after the reading system has been assembled (or after maintenance interventions wherein components have been replaced), but it can be omitted, as already stated.

Subsequently, an image is acquired which contains the optical code to be examined, block 30 The image acquisition, essential for the reading process, is also essential both for self-learning. when the reading system starts working and for self-adjustment, during standard operation. Image acquisition is characteristic of all optical code reading systems and can be carried out according to any known method, using linear or matrix sensors of CCD or CMOS type and supplies analogue or digital electrical signals correlated to the brightness level of each dot (pixel) forming the image.

Subsequently, the acquired image is analysed, block 40. This analysis, described hereinafter with reference to FIG. 3, has the aim of searching in the image for the present optical code(s); attempting decoding or recognition; and, if the outcome is positive, acquiring and suitably storing some image quantities, necessary for regulation of the controlled parameters.

Finally, it is verified whether it is necessary to modify the working point of the reading system (provided by the set of current values of the controlled parameters), to allow initial self-learning or to monitor dynamic variations of the reading system, block 50. The working point verifying step is described hereinafter with reference to FIGS. 4–9 and is followed by acquiring a new image, returning to block 20.

Figure 3:
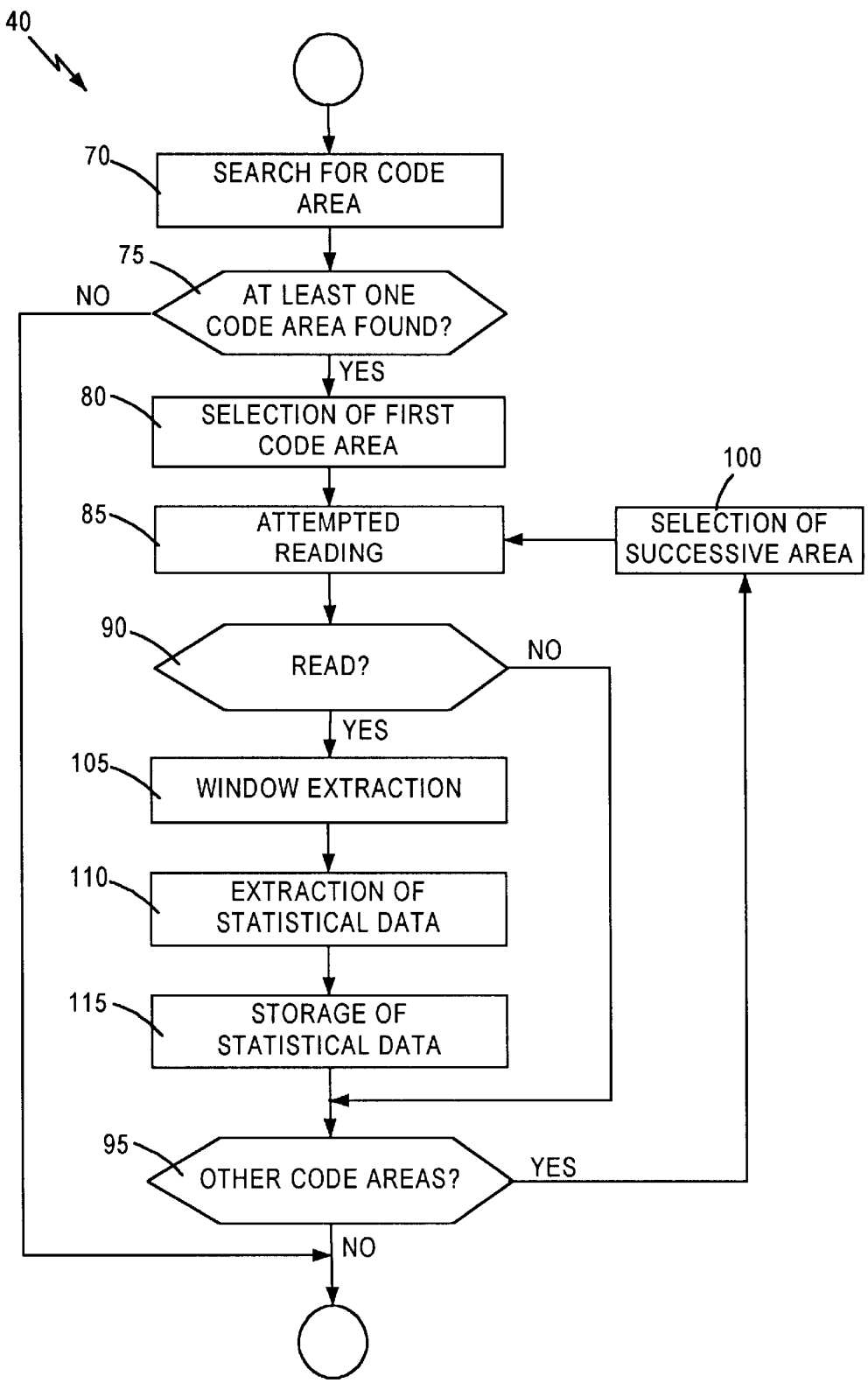
FIG. 3 shows a detailed flow chart of a block of FIG. 2.

The step of analyzing the acquired image (block 40 in FIG. 2) is now described with reference to FIG. 3. In detail, initially, the processing unit 13 searches, inside the acquired and stored image, for the areas probably containing an optical code, block 70. This step is executed in known manner, for example by looking, inside the image, for the areas with the greatest contrast, since the codes are formed by a plurality of elements or structures with different colours (for example white and black), the specific alternation of which has in fact the aim of coding data.

Subsequently, the reading system verifies whether at least one code area has been identified, block 75; if not (NO output), the analysis step 40 ends; if yes (YES output), the first (or only) identified code area is selected, block 80 and reading is attempted, block 85. The reading attempt is carried out in known manner, according to the type of code to be read; in particular, if the code to be read comprises characters, reading is based on recognising the characters in a sufficiently reliable way; if a bar code or a two-dimensional code is involved, reading comprises decoding the code in a sufficiently accurate way. For example, in case of a bar code, according to a commonly used method, it is verified whether a sequence of elements (bars) of alternate colours is present, it is verified whether the number of elements is at least equal to a predetermined value, the width of each element is measured, it is optionally verified whether the widths, or at least some of them, fulfil predetermined conditions (for example whether they are correlated to one another, or have a predetermined sequence), the sequence of numbers corresponding to the detected alternation of elements is determined and it is verified whether the obtained sequence of numbers corresponds to an acceptable code.

Subsequently, it is verified whether reading has been successful, block 90. This step is very important, since a positive outcome of code reading shows that the considered area has sufficient quality for acquiring the current values of the measuring quantities (which, according to the invention, define statistical data used for adjusting the parameter values). In fact, according to the Invention, only the image areas ensuring good reading of the optical code are used to modify the values of the parameters; on the other hand, the areas where reading is not possible or is not sufficiently reliable do not ensure that the obtained statistical data is correct and these areas are therefore rejected. Consequently, if no reading takes place (NO output from block 90), it is verified whether other code areas have been detected during the search step 70 of the same image, block 95; if there are no other areas, NO output from block 95, the image analysis step 40 ends; otherwise (other areas exist within the same image, wherein the presence of an optical code is probable, YES output from block 95), a successive code area is selected, block 100, and reading is attemped, returning to block 85.

If reading has been successful (YES output from block 90), a art of the previously identified code area is selected, i.e. specifically the area considered the best as to quality; in particular, the central part of the decoded optical code is advantageously selected, to eliminate edge effects (block 105 of window extraction).

Subsequently, the just selected window is processed to acquire the statistical data, i.e. the value of the measuring quantities, block 110. In particular, in this step, the values of all the measuring quantities are measured or calculated, including for example the maximum brightness value (i.e. the level of white in a two-colour code measured as grey levels), the minimum brightness value (black level), the average level, the signal average energy, any deviation of the code element proportions from predetermined values and any indication of the code shape deformation. In particular, on a brightness scale comprised between 0 and 255 binary levels, in suitable conditions of brightness, the white level is a binary value close to 200 and the black level is close to 10. In addition, the signal energy can be calculated as the square of the amplitude of the derivative of the brightness signal.

The just calculated statistical data is then stored in appropriate tables, one for each variable, block 115. This statistical data is advantageously stored separately, according to the distance between the examined object and the image acquisition device 10 (obtained from the height of the object the image whereof has been detected), since the optimum values of the parameters depend on this distance; additionally, the tables preferably store the number of samples acquired up to that moment, the total sum value and the average value, calculated as the total sum value, divided by the sample number. In practice, at each new acquisition, for each measured value and according to the current height value of the examined object, the number of samples is incremented by one, the total sum value is updated, the new acquired value is added to the previous total and the average value is updated.

Depending on the considered measure variable, the associated parameter and the characteristic to be optimised, two different types of table are constructed, as described in detail hereinafter with reference to FIGS. 7 and 8.

After the statistical data tables have been updated, block 115, it is verified whether a further code area exists in the same image, as already described with reference to block 95 and if not, the image analysis step 40 ends.

Before describing in detail the step 50 of verifying the working point, the mechanism for adjusting the parameters on the basis of the acquired statistical data is explained, for optimizing the characteristics of the reading system according to the present method. In fact, some characteristics (such as the image brightness, measured by the minimum and maximum brightness values), have a monotonic dependence (known exactly or at least approximately), on the respective controlled parameter(s) (amplification gain of the image acquisition device 10 and power of the lighting element 12), as shown in FIG. 4, which shows the relationship between brightness L and gain G. In this case therefore, on the basis of the measure variable value (minimum and maximum brightness value), it is simple to identify the correction to be made to the controlled parameter value, for optimizing reading. For example, if, after a predetermined number of acquisitions, all code areas acquired for a specific height are dark (maximum digitised brightness value lower than a predetermined value, for example 180), it is necessary to increase the gain and/or increase the lighting power (for example the voltage supplied to the lighting element 12).

On the other hand, other characteristics, such as focusing quality, measured as the energy of the electrical signal supplied by the image acquisition device 10, have more complex dependence on the respective controlled parameter (position of the automatic focusing device), as shown in FIG. 5, which shows the function linking the average energy E and the position P of the automatic focusing device. In this case, it is not possible to utilise directly a specific law (even if approximate) linking the measure variable and the parameter to be controlled for optimizing the reading. In fact, in case of a function of the type shown in FIG. 5, where the curve has an absolute maximum, the following problems exist:

the absolute value of the maximum A varies from image to image and therefore it is not possible to determine whether the just acquired image is the best or not;

it is not possible to determine whether the working point is located to the left or the right of the maximum (point B or C in FIG. 5, having the same ordinate); consequently, is it not even possible to determine in what direction the focusing position must vary for improving the reading.

Consequently, in case of measuring quantities not linearly associated with the respective controlled parameter, according to the present method a specific number of acquisitions is made, with slightly modified values of the controlled parameter, with a positive and a negative variation, preferably of the same value, with respect to the current setting, to allow identification of the curve point where the reading system is located and therefore determination of whether a correction is necessary and optionally of the direction of the actual correction to be made. For example, with reference to FIG. 6, which is similar to FIG. 5, if the system is located at point C, corresponding to position P1 and to average energy E1 for a specific number of acquisitions, the position value is modified initially for example by a displacement +J, to go to position P2, thus obtaining an average energy value E2 after a specific number of acquisitions; the initial value is then modified by a displacement −J. to go to position P3, thus obtaining an average energy value E3. In this case, since the optimum reading condition corresponds to a maximum energy level, it is apparent that the second setting (−J) provides the best result and thus the central value of the controlled parameter must be taken stably to P3.

In particular, the absolute value of the displacement J must be large enough to evaluate the image quality variations, but small enough not to prevent optical codes to be read. The displacement value is advantageously selected within an interval between a minimum value and a maximum value such as to allow evaluation of the variation of the detected characteristic variable and reading of the optic code, since the self-adjustment measurements take place during normal operation of the reading system and it is necessary to maintain the functionality of the reading system even for displacements moving away from the optimum condition, because the displacement direction for optimizing the operation is not known.

In addition, the modification of the controlled parameters values according to the predetermined displacements can take place at every acquisition, or at every predetermined number of acquisitions.

Then, in case of a measure variable and a controlled parameter with monotonic dependence, during the data storage step 115, a table of the type shown in FIG. 7 is advantageously used, wherein, for the sake of simplicity, the column of the total sum values is not shown; on the other hand, in case of a measure variable and a controlled parameter with non-monotonic dependence, a table of the type shown in FIG. 8 is used, indicating, for each object height value, the number of samples N(−J) and N(+J) and the calculated average energy E(−J) and E(+J), for both displacements +J and −J.

Figure 9:
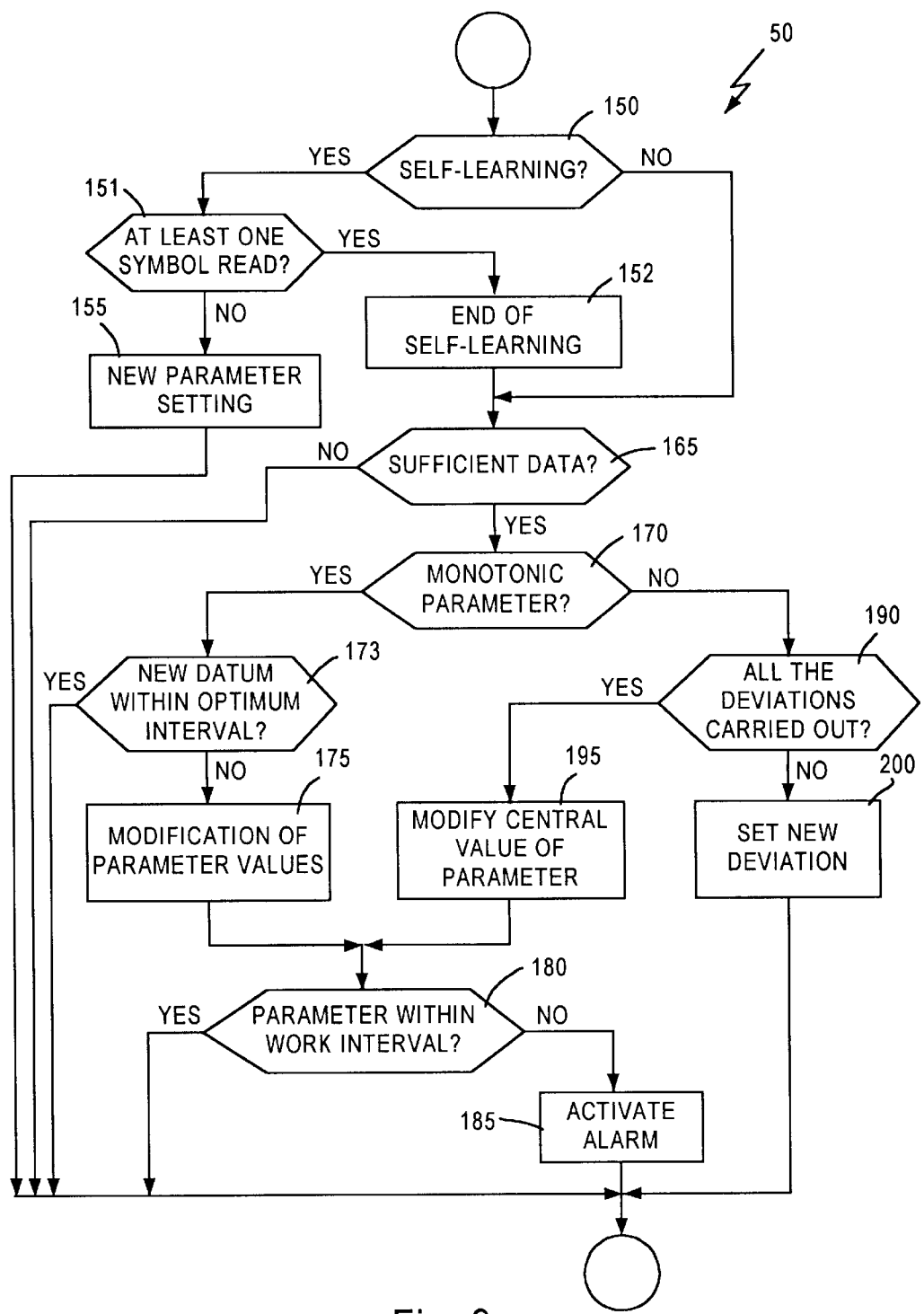
FIG. 9 shows a detailed flow chart of another block of FIG. 2.

In consideration of the above, the step of verifying and optionally modifying the working point (block 50 in FIG. 2), is now described with reference to FIG. 9, for a single controlled parameter. The step 50 is however repeated, after each image analysis step 40, for each controlled parameter of the reading system.

Initially, block 150, it is verified whether the reading system is in a condition of initial self-learning (for the considered operative condition, with the current distance between the examined object and the image acquisition device 10, an initial setting allowing reading has not yet been found), or whether it is in a fine regulation condition In the first case (YES output from block 150), it is verified whether, in the current operative condition, at least one correct code reading has been made, block 151. If not (NO output from block 151), the controlled parameters are set to values not yet used, block 155. This step, repeated during the self-learning step for each acquired image not leading to decoding an optical code, is designed to allow scanning of all the possible values of the controlled parameters according to a predetermined scheme, until a setting is found allowing code reading in the specific operative condition. Thereby, when a code is successfully read, the reading system finds a series of acceptable values for the controlled parameters, which can subsequently be refined on the basis of the statistical data, as described in detail hereinafter.

In particular, for initially setting the focusing position at a given height of the objects carrying a code to be read, the reading system attempts, in successive acquisitions, to set all the possible focusing positions, starting from an initial setting (for example the random setting at which the automatic focusing device is positioned). For example, if the intrinsic depth of field of the optical system integrated in the image acquisition device 10 is known, at each iteration, or after a predetermined number of iterations with a negative outcome, the position value is incremented by a quantity equal to half of intrinsic depth of field. In practice, a first reading is attempted on a first object or on a first group of objects moving beneath the device 10, at a first height (e.g. 10 cm), using a first focusing position value; if the outcome of this first attempt is negative, a second reading is attempted on a second object or on a second group of objects arranged at the same first height, with a second focusing position value and so on. The other controlled parameters are set analogously, and their initial values can be modified simultaneously with the focusing position value, or at the end of the entire setting sequence for the focusing position, if the sequence has not led to identify series of values allowing reading of a code.

When the current setting allows reading of a code (YES output from block 151), the self-learning step for the considered height is interrupted (block 152) and a fine regulation step begins, controlled by the NO output from block 150. Thereby, repeating the described process for all the possible heights of the objects, a first approximate value of each parameter may be associated with each height, even in the absence of an initial manual setting.

After the parameter value setting during the self-learning step, the step 50 of verifying the working point ends, and a further image is examined, returning to block 30 in FIG. 2.

If, on the other hand, checking of the considered operative condition is completed (NO output from block 150), it is verified whether sufficient statistical data has been acquired for the considered parameter in the specific operative condition, block 165. For example, the number of acquisitions considered statistically sufficient can be comprised between 500 and 1000, to take into account the high image variability and to avoid erroneous modifications of the parameters. It the outcome is negative (insufficient acquisitions, NO output from block 165), the setting is not modified and the step 50 of verifying the working point is completed; if the outcome is positive (YES output from block 165), it is verified whether the considered parameter is associated with the respective measure variable by a monotonic function, or by a more complex function (block 170).

In the first case (YES output from block 170), it is verified whether the statistical datum (average value) stored in the table in FIG. 7, for the variable(s) associated with the controlled parameter, considering the current operative condition, is within an "optimum interval", indicated as Δ in FIG. 4, where satisfactory operation takes place, block 173. If the average value stored is within the optimum interval, YES output from block 173, the step 50 of verifying the working point is completed without any variation; otherwise, NO output, the respective controlled parameter is modified, block 175.

According to a preferred, simpler embodiment, the YES output from block 170 is directly followed by block 175 and the controlled parameter is stably modified using the curve of FIG. 4.

If different parameters affect a single measure variable (and thus a corresponding characteristic of the reading system, such as gain and lighting power, as far as brightness is concerned), in a manner not illustrated, it is possible to consider both the parameters and to attempt to modify first the furthest parameter from its variability limits. For example, for the aforementioned parameters, if the lighting power is already close to the maximum value, whereas the gain is still at a low value, it is possible to increase initially the gain only. Alternatively, it is also possible to apply specific criteria to decide which parameters are to be modified and to what extent; for example, it is possible to alternately modify the two parameters, or to modify both the parameters simultaneously by a lower value than as necessary in case of modification of a single parameter.

After the new value of the controlled parameter has been set, the previously stored statistical datum and the corresponding number of acquisitions (samples) for the considered working conditions are reset; the new value of the controlled parameter is then compared with a working interval (defined as the standard interval within which the parameter may vary, block 180); if the value is within this interval (YES output), the step of verifying the working point is completed, otherwise (NO output) an alarm is started, block 185, since it is apparent that at least one component of the reading system is starting to operate unsatisfactorily (for example the lighting element 12 is becoming worn out); however the reading system continues in a normal mode, operating as well as possible and returns to acquire a new image.

If the controlled parameter is not monotonic, NO output from block 170, a predetermined deviation is provided, as previously described with reference to FIG. 6. In detail, initially, it is verified whether the planned predetermined deviations have already been made (whether the average value of the measure variable is present for both deviations +J and −J of the controlled parameter, block 190), otherwise the value of the controlled parameter is updated according to the not yet considered deviation, block 200 and the step of verifying the working point is completed. If the outcome is positive, (YES output from block 190), the statistical stored data is examined to detect which, of the "tested" values for the considered parameter, optimises the measure variable. This value is then selected and set as the central value of the controlled parameter for the successive acquisitions, to which the predetermined deviations +J and −J are applied, block 195.

Subsequently, similarly to the case of the monotonic parameter, the statistical data and the acquired sample number are reset for the considered operative condition and it is verified whether the new central value of the parameter is comprised in the planned work interval, by executing step 180.

As an alternative to the described process, when a preceding adjustment is completed, besides of the statistical datum for the predetermined deviations, the statistical datum is also acquired for the previously set central value and the decision concerning the successive setting is made by taking into account all the statistical data (for the central value and for all the planned deviations). Consequently, if the previously set central value is within an optimum predetermined interval, it is not changed, similarly to the case for the monotonic parameter. Subsequently, all the statistical data and the corresponding sample number are reset for the considered operative condition and the step 50 of verifying the working point for that parameter is completed.

The advantages of the described method are apparent from the preceding description. In particular, the present method predicts the acquisition parameters to be set, by carrying out statistical quality surveys for a large number of preceding images, successfully read; this allows optimization of the successive acquisitions, adjusted to the variations of the external and internal conditions over time. In particular, analysis over time of the modifications made to the parameters for monitoring the optimum regulation, also allows detection before component deterioration situations and timely generation of alarms, to reduce greatly, or even to eliminate, the inactivity time of the reading system, caused by faulty components.

Use of only successfully read images ("successes") guarantees the use of statistically significant data and eliminates data derived from specific conditions or affected by random errors, which could cause unjustified or incorrect modifications of the parameters being controlled. In addition, use of only the most significant portions of the read codes increases the reliability of the method and its convergence towards optimum values of the parameters.

The search for the optimum parameter values by introducing minor variations into the current values, in case of parameters associated by complex functions with the respective measure quantities, allows, by a "trial and error" process, to obtain and maintain optimum operative conditions, even if these complex functions are not known a priori.

Finally, it is apparent that many modifications and variants can be made to the method described and illustrated here, all of which come within the scope of the invention, as defined in the attached claims. In particular, it is emphasised that the described method allows optimisation of not only the focusing quality and the image brightness, but can also be applied to other parameters. For example, the present method can be used to adapt the threshold values used for decoding, when it is verified that the dimensional relationships between the code elements unacceptably differ from reference values, or are subject to incorrect variations. It can also be used to correct the value of the scanning speed of the objects, the initial setting whereof, supplied from externally, can be incorrect, since it is based on a presumed advancing speed of the conveyor belt 2, different from the actual speed detected by the optical encoder 5, or is no longer adequate, owing to variations over time in the mechanical transport system (thus giving rise to acquisition of distorted images).

In general however, the method can be applied where the acquired images are very different from one another, so that it is necessary to have a predictive adjustment of the parameters; when some basic parameters undergo fluctuations that are relatively slow compared with the image acquisition frequency; and when it is not possible or convenient to estimate the parameter fluctuations through mathematical calculations, or by using sensors only.

What is claimed is:

1. A method for automatic regulation of at least one characteristic variable of an optical code reading system, comprising the steps of:
   a) acquiring an image (30) comprising at least one optical code containing extractable information;
   b) attempting (85) a reading of said at least one optical code in said image whereby attempting to obtain at least some of said contained information;
   c) verifying whether said reading has been completed successfully;
   d) if said reading has been completed successfully, detecting (105, 110) at least one characteristic variable of said image; and e) if said reading has been successfully completed, modifying (170, 175, 195) at least one controlled parameter to cause a variation of said detected characteristic variable of said image, whereby to enhance the extractability of said contained information.

2. A method according to claim 1, wherein steps a)–d) are iteratively repeated, thereby acquiring a statistical datum for a plurality of images and in that said step e) of modifying at least one parameter (170, 175, 195) is carried out on the basis of said statistical datum.

3. A method according to claim 1, further comprising continuously adjusting said at least one controlled parameter by iteratively repeating said steps a)–e).

4. A method according to claim 3, wherein said step of continuously adjusting is performed at each reading.

5. A method according to claim 3, wherein said step of continuously adjusting is performed at a predetermined number of readings.

6. A method according to claim 1, wherein said step of detecting at least one characteristic variable further comprises a step of measuring a current value of at least one measured variable selected from the group consisting of maximum brightness, minimum brightness, average brightness value, brightness signal energy, width deviations of code elements and deformations of the optical code.

7. A method according to claim 1, wherein said step of detecting (105, 110) at least one characteristic variable further comprises the steps of:

extracting (105) a window from a region of said image; and acquiring (110) said characteristic variable in said window.

8. A method according to claim 7, wherein said window is arranged centrally to said region.

9. A method according to claim 7, wherein said step of attempting a reading further comprises the step of localizing (70) a region containing an optical code in said image.

10. A method according to claim 1, wherein said step of modifying (170, 175, 195) at least one controlled parameter further comprises the step of:

verifying (170) whether said controlled parameter has a monotonic relationship to said characteristic variable.

11. A method according to claim 10, further comprising the steps of:

verifying (173) whether said at least one characteristic variable is contained in a predetermined interval;

if said at least one characteristic is not contained in a predetermined interval, modifying (175) said controlled parameter.

12. A method according to claim 10, wherein, if said controlled parameter has a non-monotonic relationship, said method further comprising the steps of:

acquiring (195) a central value of said controlled parameter;

determining (200) a first modified value of said controlled parameter, obtained from said central value incremented by a first predetermined quantity;

acquiring (30) at least one first successfully read image;

acquiring (110) a first characteristic value of said characteristic variable from said at least one first image;

determining (200) a second modified value of said controlled parameter obtained from said central value decremented by a second predetermined quantity;

acquiring (30) at least one second successfully read image;

acquiring (110) a second characteristic value of said characteristic variable from said at least one second image; and updating (195) said central value of said controlled parameter correlated to said first modified value of said controlled parameter, if said first characteristic value of said characteristic variable is better than said second characteristic value; otherwise, updating said central value of said controlled parameter correlated to said second modified value of said controlled parameter.

13. A method according to claim 12, wherein said first and second predetermined quantities are equal to each other.

14. A method according to claim 12, wherein said first and second quantities are sufficiently large to give rise to a measurable variation of said characteristic variable and sufficiently small not to affect the possibility of reading an optical code.

15. A method according to claim 12, further comprising, after said step of acquiring a central value (195), the steps of:

acquiring (30) at least one third successfully read image; and acquiring (110) a third characteristic value of said characteristic variable from said at least one third image; and in that, if said third characteristic value of said characteristic variable is better than said first and second characteristic values, not updating said central value.

16. A method according to claim 10, wherein said step of detecting a characteristic variable further comprises the step of storing (115) a table.

17. A method according to claim 16, wherein said step of storing (115) comprises, at each step of detecting at least one characteristic variable, the further step of updating an acquired sample number of said characteristic variable and an average value of said characteristic variable.

18. A method according to claim 16, wherein at each step of detecting at least one characteristic variable and storing a characteristic variable in a table, said step of storing (115) further comprises a step of updating a respective field of said table for each operative condition.

19. A method according to claim 16, wherein said step of modifying (175, 195) at least one controlled parameter further comprises the step of resetting said acquired sample number and said average value of said characteristic variable.

20. A method according to claim 16, wherein there are a plurality of characteristic quantities and wherein said step of detecting a characteristic variable further comprises the step of storing a table for each characteristic variable.

21. A method according to claim 1, further comprising, before said steps a)–e), carrying out a step of self-learning (155) for setting an initial approximate value of said at least one controlled parameter.

22. A method according to claim 21, wherein said step of self-learning farther comprises the steps of:

f) acquiring (30) an image with a test value for said controlled parameter;

g) attempting a reading (85) of at least one optical code in said image;

h) if said reading has been successful, interrupting (150) said step of self-learning and executing said steps d) and e);

i) if said reading has not been successful, modifying (155) said test value of said controlled parameter with a new test value that had not previously been used; and j) iteratively repeating said steps f)–i).

23. A method according to claim 1, wherein, after said step of modifying (175, 195) at least one controlled parameter, carrying out the further steps of:

verifying (180) whether said controlled parameter has an acceptable value; and if said controlled parameter does not have an acceptable value, generating (185) an alarm signal.

24. A method according to claim 1, wherein said successful completion of said reading has a positive result.

25. A method according to claim 24, wherein said modification of said controlled parameter is carried out if said successful reading has a positive result.

26. A method as claimed in claim 1 wherein said modification of said controlled parameter is carried out only after at least one successful reading has been determined.

27. A method as claimed in claim 1 wherein said at least one optical code comprises a graphical representation storing at least one coded value.

28. A method as claimed in claim 27 wherein said at least one optical code is selected from the group consisting of a linear code and a two dimensional code.

29. A method as claimed in claim 27 wherein said at least one optical code is selected from the group consisting of elements of a predetermined shape, elements separated by light spaces, specific patterns, alpha numeric indicia, and different colors.

30. A method as claimed in claim 29 wherein said elements of predetermined shape comprise geometric shapes.

31. A method as claimed in claim 27 wherein said at least one optical code is selected from the group consisting of bar codes, stacked codes, Maxicode, Datamatrix, and QR code.

32. A method for automatic regulation of at least one characteristic variable of an optical code reading system, comprising iteratively repeating the steps of:
   a) acquiring an image (30) comprising at least one optical code containing extractable information;
   b) attempting (85) a reading of said at least one optical code in said image whereby attempting to obtain at least some of said contained information;
   c) verifying whether said reading has been completed successfully;
   d) if said reading has been completed successfully, detecting (105, 110) said characteristic variable of said image; and
   e) if said reading has been successfully completed, modifying (170, 175, 195) at least one controlled parameter to cause a variation of said characteristic variable, whereby to enhance the extractability of said contained information, said controlled parameter being modified by a quantity contained between a minimum and a maximum value, said minimum value being such as to allow evaluation of said variation of said detected characteristic variable and said maximum value being such that said step c) of verifying has a positive outcome in a following repetition.

33. A method for automatic regulation of at least one characteristic variable of an optical code reading system, comprising the steps of:
   a) acquiring an image (30) comprising at least one optical code containing information;
   b) attempting (85) a reading of said at least one optical code in said image, whereby attempting to extract at least some of said contained information;
   c) verifying whether said reading has been completed successfully;
   d) if said reading has been completed successfully, detecting (105, 110) at least one characteristic variable of said image; and
   e) if said reading has been successfully completed, modifying (170, 175, 195) at least one controlled parameter to cause a variation of said detected characteristic variable of said image,
   wherein said characteristic variable is at least one member selected from the group consisting of image brightness and focusing quality.

34. A method for automatic regulation of at least one characteristic variable of an optical code reading system, comprising the steps: of;
   a) acquiring an image (30) comprising at least one optical code containing extractable information;
   b) attempting (85) a reading of said at least one optical code in said image, whereby attempting to extract at least some of said contained information;
   c) verifying whether said reading has been completed successfully;
   d) if said reading has been completed successfully, detecting (105, 110) at least one characteristic variable of said image; and
   e) if said reading has been successfully completed, modifying (170, 175, 195) at least one controlled parameter to cause a variation of said detected characteristic variable of said image, whereby to enhance the extractability of said contained information,
   wherein said at least one controlled parameter is selected from the group consisting of focusing position, image acquisition sensitivity, lighting power, reading decision-making threshold value and scanning speed.

35. A method of operating an optical code reading system having at least one controlled parameter acting on the variation of at least one characteristic variable of the optical code reading system, comprising the steps of:
   a) acquiring an image, comprising at least one optical code containing information, at a working point of said optical code reading system;
   b) attempting a reading of said at least one optical code in said image, whereby attempting to obtain said contained information;
   c) verifying whether said reading has been completed successfully;
      d1) if said verification has a negative result, maintaining a current value of said at least one parameter;
      d2) if said verification has a positive result:
   e) detecting at least one characteristic variable for said image; and
   f) performing a fine regulation step of said working point by modifying said at least one controlled parameter acting on the variation of said at least one characteristic variable,
   wherein said at least one controlled parameter is selected from the group consisting of focusing position, image acquisition sensitivity, lighting power, reading decision-making threshold value and scanning speed, and wherein said at least one characteristic variable is at least one member selected from the group consisting of image brightness and focusing quality.

36. A method according to claim 35, wherein steps a)–e) are iteratively repeated, thereby acquiring a statistical datum for a plurality of images and in that said step f), of performing a fine regulation step of said working point by modifying at least one parameter, is carried out on the basis of said statistical datum.

37. A method according to claim 35, further comprising continuously adjusting said at least one controlled parameter by iteratively repeating said steps a)–f).

38. A method according to claim 37, wherein said step of continuously adjusting is performed at each reading.

39. A method according to claim 37, wherein said step of continuously adjusting is performed at a predetermined number of readings.

* * * * *

UNITED STATES PATENT AND TRADEMARK OFFICE
CERTIFICATE OF CORRECTION

PATENT NO. : 6,616,039 B1
DATED : September 9, 2003
INVENTOR(S) : Claudio Saporetti et al.

It is certified that error appears in the above-identified patent and that said Letters Patent is hereby corrected as shown below:

<u>Title page,</u>
Item [30], Foreign Application Priority Data, change "(IT)" to -- (EP) --

Signed and Sealed this

Third Day of May, 2005

JON W. DUDAS
*Director of the United States Patent and Trademark Office*